United States Patent
Rotem et al.

(10) Patent No.: US 11,019,108 B2
(45) Date of Patent: May 25, 2021

(54) SYSTEM AND METHOD FOR INTERCEPTION OF IP TRAFFIC BASED ON IMAGE PROCESSING

(71) Applicant: Verint Systems Ltd., Herzliya Pituach (IL)

(72) Inventors: Aviad Rotem, Petah-Tikva (IL); Ariel Zamir, Tel Aviv (IL)

(73) Assignee: VERINT SYSTEMS LTD., Pituach (IL)

( * ) Notice: Subject to any disclaimer, the term of this patent is extended or adjusted under 35 U.S.C. 154(b) by 0 days.

(21) Appl. No.: 15/642,587

(22) Filed: Jul. 6, 2017

(65) Prior Publication Data

US 2017/0310711 A1    Oct. 26, 2017

Related U.S. Application Data

(63) Continuation of application No. 13/663,388, filed on Oct. 29, 2012, now Pat. No. 9,742,812.

(30) Foreign Application Priority Data

Oct. 31, 2011    (IL) .......................................... 216057

(51) Int. Cl.
*H04L 29/06* (2006.01)
*H04L 29/08* (2006.01)
(Continued)

(52) U.S. Cl.
CPC ............ *H04L 63/306* (2013.01); *H04L 67/22* (2013.01); *H04W 4/21* (2018.02); *G06K 9/00288* (2013.01); *H04L 63/164* (2013.01)

(58) Field of Classification Search
CPC ................ G06F 21/88; G06K 9/00771; G06K 9/00288; H04L 63/306; H04L 67/22; H04L 63/164; H04W 4/21
See application file for complete search history.

(56) References Cited

U.S. PATENT DOCUMENTS 8,856,869 B1    10/2014    Brinskelle
9,049,117 B1 *    6/2015    Nucci .................... H04L 63/302
(Continued)

FOREIGN PATENT DOCUMENTS

WO    2010/116292    10/2010

OTHER PUBLICATIONS

Asokan et al. Man-in-the-Middle in Tunnelled Authentication (Year: 2002).*

(Continued)

*Primary Examiner* — Kenny A Cese
(74) *Attorney, Agent, or Firm* — ISUS Intellectual Property PLL; Anthony Jason Mirabito

(57) ABSTRACT

Methods and systems for monitoring communication traffic in communication networks, such as Internet Protocol (IP) traffic transferred over the Internet or over a wireless network. The disclosed techniques identify communication traffic that is associated with target individuals, by extracting digital images from the traffic and recognizing target individuals who appear in the images. A correlation system monitors communication sessions that are conducted in a communication network to identify known target individuals who appear in images. Upon recognizing a target individual in an image extracted from a certain session, the system correlates this target user with one or more of the communication identifiers used in the session. The system automatically identifies IP addresses or other identifiers that are used by target individuals, and enable subsequent tracking of such identifiers.

15 Claims, 2 Drawing Sheets

(51) Int. Cl.
*H04W 4/21* (2018.01)
*G06K 9/00* (2006.01)

(56) References Cited

U.S. PATENT DOCUMENTS

| | | | |
|---|---|---|---|
| 9,152,706 B1* | 10/2015 | Claudatos | G06F 16/7837 |
| 2002/0087643 A1* | 7/2002 | Parsons | G06Q 30/02 |
| | | | 709/206 |
| 2002/0141618 A1 | 10/2002 | Ciolli et al. | |
| 2005/0071632 A1 | 3/2005 | Pauker et al. | |
| 2005/0175156 A1 | 8/2005 | Afshar et al. | |
| 2008/0133697 A1 | 6/2008 | Stewart et al. | |
| 2008/0162135 A1 | 7/2008 | Claudatos et al. | |
| 2009/0031245 A1* | 1/2009 | Brezina | H04M 15/00 |
| | | | 715/781 |
| 2009/0232417 A1* | 9/2009 | McMahan | G06F 16/58 |
| | | | 382/309 |
| 2009/0233623 A1 | 9/2009 | Johnson | |
| 2011/0046920 A1 | 2/2011 | Amis | |
| 2011/0083010 A1 | 4/2011 | Cohen et al. | |
| 2011/0264905 A1* | 10/2011 | Ovsiannikov | H04L 63/168 |
| | | | 713/151 |
| 2011/0282697 A1 | 11/2011 | Fitzgerald et al. | |
| 2011/0282860 A1* | 11/2011 | Baarman | G06F 16/951 |
| | | | 707/709 |
| 2012/0019674 A1 | 1/2012 | Ohnishi et al. | |

OTHER PUBLICATIONS

"Man-in-the-Middle in Tunnelled Authentication", Asokan et al. (Year: 2002).*

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

Girardin, F., et al., "Detecting air travel to survey passengers on a worldwide scale," Journal of Location Based Services, 2010, 26 pages.

Meyer, U., et al., "On the Impact of GSM Encryption and Man-in-the-Middle Attacks on the Security of Interoperating GSM/UMTS Networks," proceedings of the 15th IEEE International Symposium on Personal, Indoor and Mobile Radio Communications, 2004, pp. 2876-2883.

Vedaldi, A., "An implementation of SIFT detector and descriptor," University of California at Los Angeles, 2007, 7 pages.

Extended European Search Report, dated Mar. 13, 2013, received in connection with European Application No. 12190632.5.

Examination Report, dated Mar. 5, 2018, received in connection with European Application No. 12190632.5.

* cited by examiner

SYSTEM AND METHOD FOR INTERCEPTION OF IP TRAFFIC BASED ON IMAGE PROCESSING

CROSS-REFERENCE TO RELATED APPLICATION

This application is a continuation of U.S. patent application Ser. No. 13/663,388 filed on Oct. 29, 2012, which claims priority to Israel Patent Application No. 216057 filed Oct. 31, 2011. The contents of each of these applications is hereby incorporated herein by reference in its entirety.

FIELD OF THE DISCLOSURE

The present disclosure relates generally to communication monitoring, and particularly to methods and systems for monitoring communication traffic based on image processing.

BACKGROUND OF THE DISCLOSURE

Various image processing techniques for recognizing faces in images are known in the art. Face recognition is used in a variety of applications, such as in security, biometry, border control and visa processing systems. Face recognition solutions are offered, for example, by Face.com (Tel Aviv, Israel), L1 Identity Solutions, Inc. (Billerica, Mass.) and Cognitec Systems (Dresden, Germany), among others.

SUMMARY OF THE DISCLOSURE

An embodiment that is described herein provides a method including monitoring communication sessions conducted in a communication network. A digital image and a communication identifier are extracted from a monitored communication session. A known target individual appearing in the extracted image is recognized, and the target individual is associated with the communication identifier.

In some embodiments, recognizing the target individual includes applying a face recognition process to the extracted image so as to recognize a face of the target individual in the image. In an embodiment, recognizing the target individual includes comparing the extracted image to a database of images of target individuals. In a disclosed embodiment, monitoring the communication sessions includes receiving communication traffic from the communication network, and reconstructing the communication sessions from the received communication traffic.

In an embodiment, one or more of the communication sessions is encrypted with a transport-layer cryptographic protocol, and monitoring the communication sessions includes decrypting the cryptographic protocol before extracting the digital image and the communication identifier. In an example embodiment, extracting the communication identifier includes extracting an Internet Protocol (IP) address. In another embodiment, extracting the communication identifier includes extracting an e-mail address. In yet another embodiment, extracting the communication identifier includes extracting a chat nickname.

In another embodiment, monitoring the communication sessions includes monitoring communication packets transferred over a wireless network, and extracting the communication identifier includes extracting an identifier of a wireless communication terminal that participates in the monitored communication session. In an embodiment, the wireless network includes a Wireless Local Area Network (WLAN). In a disclosed embodiment, extracting the communication identifier includes extracting a Medium Access Control (MAC) address that identifies the wireless communication terminal.

In another embodiment, the wireless network includes one of a Global System for Mobile communications (GSM) and a Universal Mobile Telecommunications System (UMTS) Network. In some embodiments, extracting the communication identifier includes correlating an Internet Protocol (IP) address extracted from the monitored communication session with the identifier of the wireless communication terminal.

In some embodiments, extracting the communication identifier includes extracting an application-layer identifier. Extracting the digital image may include extracting one of a still image and a video image. In some embodiments, the method includes outputting an association between the target individual with the communication identifier, so as to act upon one or more other communication sessions of the target individual using the communication identifier. In some embodiments, recognizing the target individual includes recognizing in the extracted image a car license plate that is associated with the target individual. In some embodiments, recognizing the target individual includes recognizing in the extracted image a body feature that is associated with the target individual.

There is additionally provided, in accordance with an embodiment that is described herein, apparatus including an interface and a processor. The interface is connected to a communication network and is configured to monitor communication sessions conducted in the network. The processor is configured to extract from a monitored communication session a digital image and a communication identifier, to recognize a known target individual appearing in the extracted image, and to associate the target individual with the communication identifier.

There is also provided, in accordance with an embodiment that is described herein, a computer software product. The product includes a tangible non-transitory computer-readable medium, in which program instructions are stored, which instructions, when read by a computer, cause the computer to monitor communication sessions conducted in a communication network, to extract from a monitored communication session a digital image and a communication identifier, to recognize a known target individual appearing in the extracted image, and to associate the target individual with the communication identifier.

The present disclosure will be more fully understood from the following detailed description of the embodiments thereof, taken together with the drawings in which:

DETAILED DESCRIPTION OF EMBODIMENTS

Overview

Embodiments that are described herein provide improved methods and systems for monitoring communication traffic in communication networks, such as Internet Protocol (IP) traffic transferred over the Internet or over a wireless network. The disclosed techniques identify communication traffic that is associated with target individuals, by extracting digital images from the traffic and recognizing target individuals who appear in the images.

In a typical embodiment, a correlation system monitors communication sessions that are conducted in a communication network. The system extracts two types of information from the monitored sessions: Digital images that are exchanged during the sessions, and communication identifiers, such as IP addresses, which are used in the sessions. The system applies face recognition techniques to the extracted images, attempting to identify known target individuals who appear in the images. For example, the system may compare the extracted images to a database of facial images of target individuals.

Upon recognizing a target individual in an image extracted from a certain session, the system correlates this target user with one or more of the communication identifiers used in the session. For example, the system may detect that a target individual appears in an image that is attached to an e-mail originating from a certain IP address, and thus correlate the target individual with the IP address. Once a correlation of this sort is established, the system regards communication sessions that use the identifier as likely to be conducted by the target individual. Such sessions can be tracked, recorded, prioritized or otherwise acted upon.

The disclosed techniques automatically identify IP addresses or other identifiers that are used by target individuals, and enable subsequent tracking of such identifiers. These techniques are highly effective against target individuals who take measures to evade surveillance, e.g., users who connect to the network from Internet Cafés that use Network Address Translation (NAT), or users who frequently change application-level identifiers such as Radius usernames, e-mail addresses or chat nicknames.

In some embodiments, the monitored communication traffic is encrypted with a cryptographic transport-layer protocol, e.g., SSL or TLS, and the system applies "Man in The Middle" (MITM) techniques to decrypt the traffic before extracting the identifiers and images.

System Description

Figure 1:
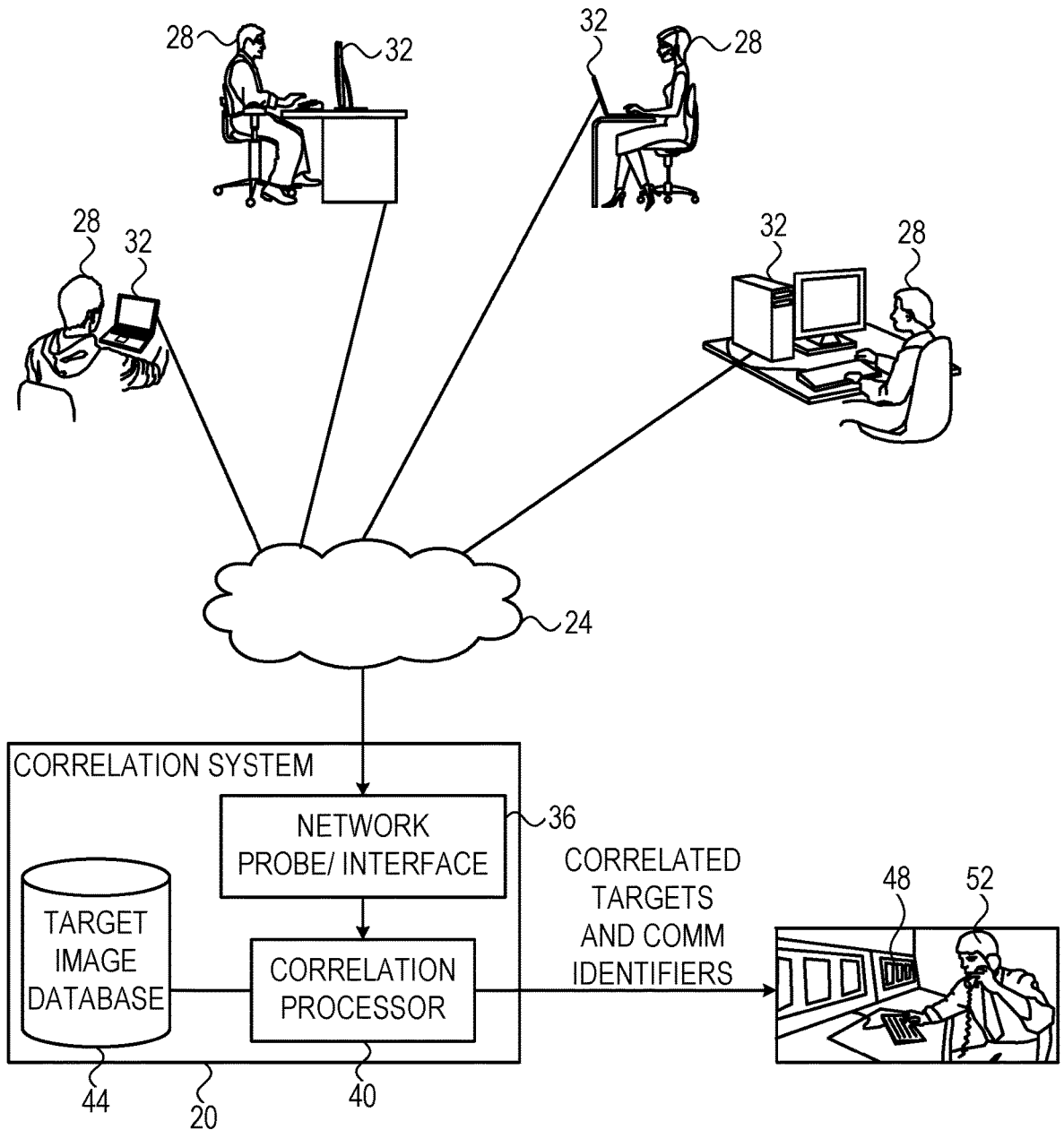
FIG. 1 is a block diagram that schematically illustrates a system for correlating communication traffic with target individuals, in accordance with an embodiment of the present disclosure.

FIG. 1 is a block diagram that schematically illustrates a system 20 for correlating communication traffic with target individuals, in accordance with an embodiment of the present disclosure. A system of this sort may be used, for example, by intelligence or law enforcement agencies for tracking communication traffic of suspect individuals.

System 20 is connected to a data communication network 24, typically an Internet Protocol (IP) network. Network 24 may comprise, for example, the Internet, an enterprise Intranet, a wireless network (e.g., a cellular network or a Wireless Local Area Network—WLAN—also referred to as Wi-Fi network), or any other public or private network. A cellular network may comprise, for example, a Global System for Mobile communications (GSM) or Universal Mobile Telecommunications System (UMTS) network.

Multiple individuals 28, also referred to as users, conduct communication sessions over network 24 using computers 32 or other computing or communication terminals. In the context of the present patent application and in the claims, the term "communication session" refers to any kind of communication interaction over the network. A session may involve a single user (e.g., sending an e-mail message or uploading a file) or multiple users (e.g., a chat or instant messaging session).

A given session involves the exchange of communication traffic, e.g., IP packets, over the network. The communication traffic of a given session typically comprises communication identifiers such as IP addresses. In some cases the identifiers identify session endpoints, e.g., computers 32 or cellular phones. In other cases identifiers may identify intermediate nodes in the network.

When network 24 comprises a wireless network, e.g., a cellular network that supports IP over General Packet Radio Service (GPRS) or other form of wireless packet communication, the communication identifiers may identify the communication terminals (e.g., cellular phones) participating in the session. Such terminal identifiers may comprise, for example, International Mobile Subscriber Identities (IMSI), International Mobile Equipment Identities (IMEI) or Mobile Subscriber Integrated Services Digital Network Number (MSISDN). In some embodiments, the extracted IP address is correlated with the terminal identifier (e.g., IMSI or IMEI).

In a WLAN (Wi-Fi network), the communication identifier may comprise a Medium Access Control (MAC) address of the terminal. Other example communication identifiers comprise application-layer identifiers such as social network (e.g., Facebook) accounts, user IDs in Web sites such as Picasa, chat nicknames or e-mail addresses.

Tracking the communication traffic of a target individual (e.g., suspected terrorist or criminal) typically involves finding one or more communication identifiers (e.g., IP addresses, email-address or chat nickname) that are associated with the target individual, and tracking the communication traffic associated with these identifiers. In some scenarios, however, it is difficult to associate communication identifiers with target users, especially when the target user is aware of possible surveillance and takes measures to evade it.

For example, target individuals may conduct communication sessions from Internet cafés that use Network Address Translation (NAT). In such a scenario, a NAT router encapsulates the IP addresses of multiple computers located behind it. As a result, the IP addresses that appear in the network traffic is not the IP address of the actual computer used by the individual, and therefore difficult to correlate. In other scenarios, target individuals may hide their IP addresses using other means in order to avoid recognition, such as using standard Web services. In another scenario, a target individual may communicate using a prepaid cellular phone that is not known to the law enforcement agency. Other target individuals may switch e-mail addresses or nicknames.

System 20 is able to correlate communication identifiers with target individuals, even at such problematic scenarios, by analyzing digital images that are extracted from the communication traffic, as will be explained below.

In many cases, users 28 send and receive digital images as part of the communication sessions they conduct over network 24. For example, a user may send or receive e-mail messages with embedded or attached images, or upload images to an image sharing Web-site or a social network page. In these scenarios, the communication traffic of the sessions will comprise the digital images.

The appearance of a target individual in an image obtained from a communication session is a strong indicator that the session is conducted by that individual, or at least that the session is related to that individual. System 20 monitors communication sessions conducted in network 24. The system extracts both digital images and communication identifiers from the monitored sessions. The system attempts to detect target individuals appearing in the images, e.g., by applying face recognition methods to the extracted images. Upon identifying that a target individual appears in an image extracted from a given session, the system correlates that individual with one or more of the communication identifiers extracted from the session.

System 20 may extract images and identifiers from various kinds of communication sessions that are conducted using a variety of applications, such as, for example, e-mail, Web-mail, Peer-to-Peer (P2P), chat, Instant messaging, File transfer Protocol (FTP) applications, social networks, file sharing, image-sharing or video-sharing Web-sites, and/or any other suitable session type.

In the example embodiment of FIG. 1, system 20 comprises a network probe or other network interface 36 for communicating with network 24. System 20 further comprises a correlation processor 40 that carries out the methods described herein. In some embodiments, system 20 comprises a target image database 44 that holds facial images of known target individuals. In these embodiments, processor 40 identifies target individuals in the images extracted from the sessions by comparing the extracted images to the images stored in database 44.

Processor 40 may use any suitable face recognition or other image processing method for detecting the appearance of target individuals in the extracted images. In various embodiments, the processor may use face detection algorithms such as (but not limited to) Viola-Jones object detection framework, Schneiderman & Kanade and Rowley, Baluja & Kanade, and/or face recognition algorithms such as (but not limited to) Principal Component Analysis, Linear Discriminate Analysis, and Elastic Bunch Graph Matching—among others, possibly proprietary, licensed or others.

Processor 40 may take various actions upon correlating a certain communication identifier with a certain target individual. In the present example, processor 40 reports the identified correlation to a monitoring center 48 for presenting to an operator 52. Additionally or alternatively, processor 40 may store the correlation, e.g., in database 44, for future reference.

Processor 40 and/or monitoring center 48 may act upon the identified correlation in various ways using the communication identifier. For example, communication sessions comprising this identifier can be tracked with high priority or recorded for future analysis. Additionally or alternatively, an alert may be triggered upon detecting new communication sessions comprising the identifier. In some embodiment, the correlation operation is performed in real time, so that subsequent communication sessions can be tracked or otherwise acted upon immediately as they are intercepted. In some embodiments, the correlation can be applied to communication sessions that were previously monitored and recorded for off-line analysis.

The configuration of system 20 shown in FIG. 1 is an example configuration, which is chosen purely for the sake of conceptual clarity. In alternative embodiments, any other suitable system configuration can also be used. Some elements of system 20 may be implemented in hardware, e.g., in one or more Application-Specific Integrated Circuits (ASICs) or Field-Programmable Gate Arrays (FPGAs). Additionally or alternatively, some system elements can be implemented using software, or using a combination of hardware and software elements. Database 44 may be implemented using any suitable type of memory, such as using one or more magnetic or solid state memory devices.

Typically, processor 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Correlation Method Description

Figure 2:
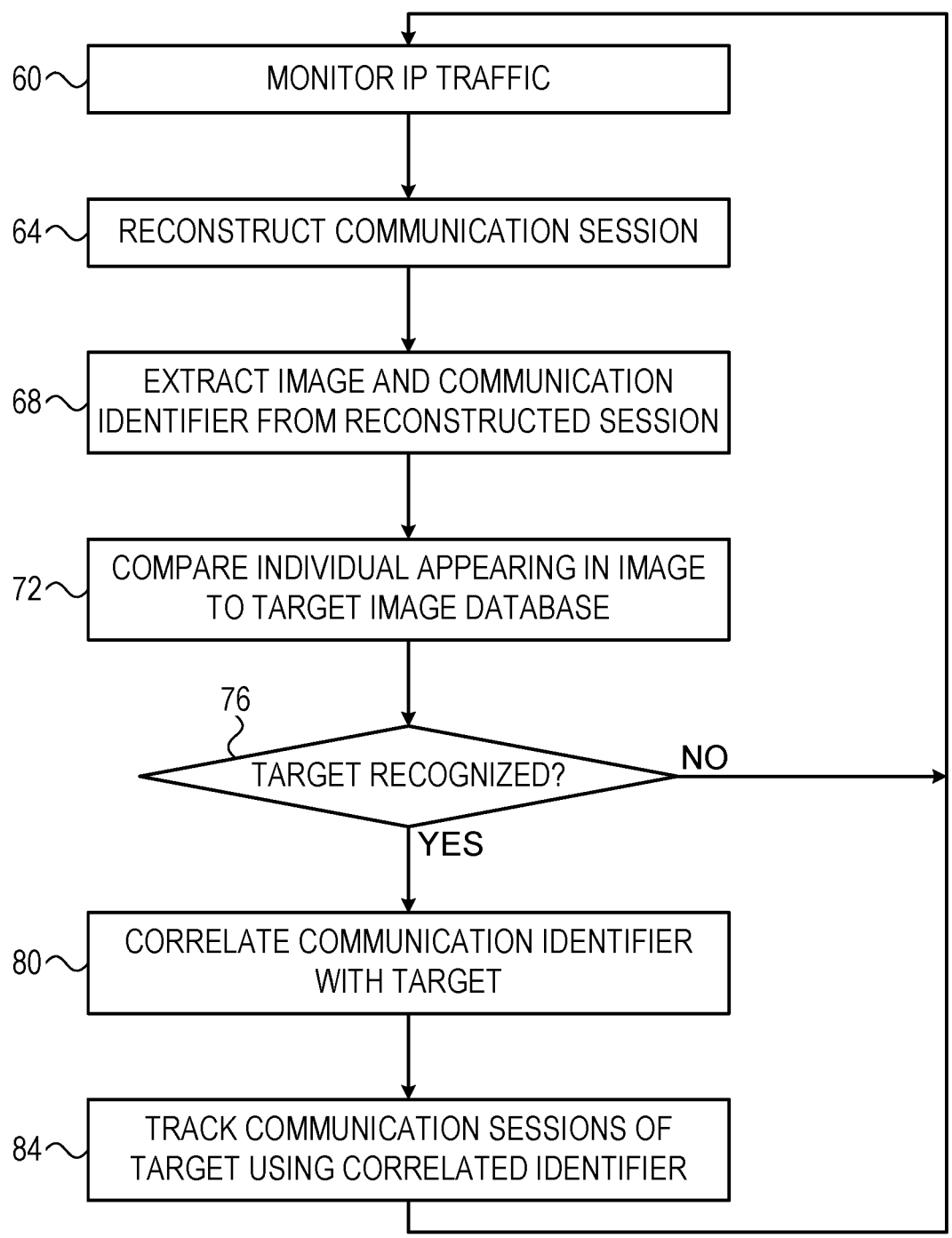
FIG. 2 is a flow chart that schematically illustrates a method for correlating communication traffic with target individuals, in accordance with an embodiment of the present disclosure.

FIG. 2 is a flow chart that schematically illustrates a method for correlating communication traffic with target individuals, in accordance with an embodiment of the present disclosure. The method begins with network interface 36 monitoring IP traffic of network 24, at a monitoring step 60. Correlation processor 40 processes the monitored IP traffic in order to reconstruct communication sessions, at a session reconstruction step 64.

Having reconstructed the communication sessions, processor 40 extracts digital images and communication identifiers from the sessions, at an extraction step 68. Processor 40 may identify and extract various types of digital images, such as bitmap images, JPEG images, TIFF images or any other suitable image type. Additionally or alternatively to still images, processor 40 may identify and extract video images of any suitable format, such as MPEG.

Processor 40 compares the extracted images to the images of the known target individuals in database 44, at a matching step 44. Any suitable face recognition method can be used for this purpose. Processor 40 checks whether a match is found, at a checking step 76. If no target individual is found to appear in the images, the method loops back to step 60 above and the system continues to monitor IP traffic.

If processor 40 detects the appearance of a target individual in an image extracted from a given session, the processor establishes a correlation between the target individual and one or more of the communication identifiers extracted from that session, at a correlation step 80. Processor 40 and/or monitoring center 48 tracks or otherwise acts upon one or more other communication sessions comprising the identifier in question, at a tracking step 84.

Integration with MITM

In some embodiments, some or all of the IP traffic monitored by system 20 is encrypted in accordance with a cryptographic transport-layer protocol, e.g., SSL or TLS. When such a protocol is identified, processor 40 decrypts the transport-layer encryption before extracting the images and communication identifiers. In these embodiments, the monitored traffic is diverted to pass through system 20 before reaching its intended destination. After decrypting the traffic, processor 40 re-encrypts the traffic with the applicable transport-layer encryption and sends the re-encrypted traffic to its intended destination.

Processor 40 may use various techniques for decrypting and re-encrypting the transport-layer encryption. In some embodiments, the transport-layer encryption comprises a public-key encryption scheme in which one end of the link provides a security certificate to the other end. In some embodiments, processor 40 replaces the certificate with a substitute certificate, and is therefore able to decrypt the transport-layer encryption. Processes of this sort are sometimes referred to as SSL Man in The Middle (SSL MITM) and are described, for example, by Soghoian and Stamm, in "Certified Lies: Detecting and Defeating Government Interception Attacks Against SSL," April, 2010, which is incorporated herein by reference.

When using SSL MITM, processor 40 typically intervenes in SSL sessions as they are established or negotiated. In the connection process, processor 40 transparently establishes two SSL sessions, one with each endpoint of the communication session. Each SSL session terminates at processor 40. Nevertheless, processor 40 ensures that the TCP connection between the two endpoints of the communication session remains intact and valid and the TCP ACK loop continues to operate between them. Terminating and re-originating SSL sessions allows processor 40 to extract the data from the encrypted payload for further processing. The SSL MITM technique typically does not involve any network identifiers of its own (e.g., IP address or MAC address), and is therefore undetectable by the users.

Example inspection techniques that use substitute certificates are offered, for example, by Blue Coat Systems (Sunnyvale, Calif.), and by Check Point Software Technologies (Tel Aviv, Israel). Example inspection solutions that are produced by Netronome Systems, Inc. (Cranberry Twp., Pa.) are described in "Examining SSL-Encrypted Communications Netronome SSL Inspector™ Solution Overview," February, 2010, which is incorporated herein by reference. SSL inspection products are also offered by Packet Forensics, Inc. (Tempe, Ariz.). Processor 40 may use any of these techniques, or any other suitable technique.

Although the embodiments described herein mainly address face recognition, the disclosed techniques may also be implemented using any other suitable image processing method that is able to identify specific individuals in digital images. Such a method may identify, for example, unique body features such as tattoos that are characteristic of the target individuals. As another example of recognizing target individuals using image processing, processor 40 may identify the license plate number of a car that appears in the extracted images. If the recognized license plate number is known to belong to a target individual, this recognition can be used as an indication that this individual is associated with the session.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    monitoring, by a first system, communication sessions conducted in a communication network;
    decrypting, by the first system, the monitored communication session;
    extracting, by the first system, from the decrypted monitored communication session a digital image and an application-layer communication identifier, wherein the application-layer communication identifier comprises one of an e-mail address used in the monitored communication session or a chat nickname used in the monitored communication session;
    re-encrypting, by the first system, the decrypted monitoring communication session;
    recognizing, by the first system, a known target individual appearing in the extracted image; and
    in response to recognizing the known target individual appearing in the extracted image, establishing, by the first system, a correlation between the target individual and the application-layer communication identifier; and
    sending, by the first system, the re-encrypted monitored communication session to an intended destination.

2. The method according to claim 1, further comprising:
    reporting, by the first system, the correlation between the target individual and the application-layer communication identifier to a second system, wherein the second system is configured to utilize the reported correlation to track subsequent communication sessions that include the application-layer communication identifier.

3. The method according to claim 1, wherein recognizing the target individual comprises applying a face recognition process to the extracted image so as to recognize a face of the target individual in the image.

4. The method according to claim 1, wherein recognizing the target individual comprises identifying a body feature of the target individual, a tattoo of the target individual, or a license plate number known to belong to the target individual in the image.

5. The method according to claim 1, wherein monitoring the communication sessions comprises receiving communication traffic from the communication network, and reconstructing the communication sessions from the received communication traffic.

6. The method according to claim 2, further comprising:
    maintaining, by the system, a target image database of a target image artifacts associated with known target individuals.

7. The method according to claim 6, wherein recognizing the known target individual appearing in the extracted image comprises comparing, by the system, the image to the target image artifacts maintained in the target image database.

8. The method according to claim 2, wherein the correlation between the target individual and the application layer is not known to the second system prior to the first system reporting the correlation to the second system.

9. The method according to claim 8, further comprising:
    triggering an alert upon detecting a new communication session comprising the application-layer communication identifier.

10. The method according to claim 1, further comprising:
    applying the correlation between the target individual and the application-layer communication identifier to a plurality of communication sessions that were previously monitored and recorded.

11. The method according to claim 7, wherein recognizing the known target individual appearing in the extracted image comprises recognizing a target image artifact associated with the known target individual appearing in the extracted image.

12. The method according to claim 11, wherein the target image artifact is a face image of the target individual, a body feature of the target individual, a tattoo of the target individual, or a license plate number known to belong to the target individual.

13. The method according to claim 2, wherein monitoring the communication sessions comprises monitoring communication packets transferred over a wireless network, and wherein extracting the communication identifier comprises extracting an identifier of a wireless communication terminal that participates in the monitored communication session.

14. The method according to claim 13, wherein the wireless network is one of a Global System for Mobile communications (GSM), a Universal Mobile Telecommunications System (UMTS) Network, or Wireless Local Area Network (WLAN).

15. The method of claim 1, wherein the application-layer communication identifier further comprises one or more of an identifier of a Peer-to-Peer (P2P) application, an identifier of an instant messaging application, an identifier of a file transfer protocol (FTP) application, an identifier of a social network application, an identifier of a file sharing application, an identifier of an image-sharing application, and an identifier of a video-sharing application.

* * * * *